United States Patent
Brown et al.

(10) Patent No.: US 9,957,401 B2
(45) Date of Patent: *May 1, 2018

(54) SOLVENT-BASED INKJET INK FORMULATIONS

(71) Applicant: Markem-Imaje Corporation, Keene, NH (US)

(72) Inventors: Benjamin J. Brown, Keene, NH (US); Richard C. Woudenberg, Keene, NH (US); Richard J. Larson, Jr., Walpole, NH (US); Ann Benjamin, Spofford, NH (US); Corey Williams, Keene, NH (US)

(73) Assignee: Markem-Imaje Corporation, Keene, NH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/055,152

(22) Filed: Feb. 26, 2016

(65) Prior Publication Data

US 2016/0177117 A1    Jun. 23, 2016

Related U.S. Application Data

(63) Continuation of application No. 14/301,287, filed on Jun. 10, 2014, now Pat. No. 9,284,463, which is a continuation of application No. 12/839,534, filed on Jul. 20, 2010, now Pat. No. 8,778,074.

(60) Provisional application No. 61/227,007, filed on Jul. 20, 2009.

(51) Int. Cl.
*C09D 11/36* (2014.01)
*C09D 11/30* (2014.01)
*C09D 11/38* (2014.01)
*C09D 11/103* (2014.01)
*C09D 11/107* (2014.01)

(52) U.S. Cl.
CPC ........... *C09D 11/36* (2013.01); *C09D 11/103* (2013.01); *C09D 11/107* (2013.01); *C09D 11/30* (2013.01); *C09D 11/38* (2013.01)

(58) Field of Classification Search
CPC .................................................... C09D 11/36
See application file for complete search history.

(56) References Cited

U.S. PATENT DOCUMENTS

| 4,155,767 A | 5/1979 | Specht et al. |
| 4,165,399 A | 8/1979 | Germonprez |
| 4,199,649 A | 4/1980 | Yundt |
| 4,210,566 A | 7/1980 | Murray |

(Continued)

FOREIGN PATENT DOCUMENTS

| AU | 2012229778 A1 | 8/2013 |
| AU | 2013229582 A1 | 8/2014 |

(Continued)

OTHER PUBLICATIONS

European Application No. 10735405.2, Communication pursuant to Article 94(3), dated May 22, 2016, 5 pages.

(Continued)

*Primary Examiner* — Veronica F Faison
(74) *Attorney, Agent, or Firm* — Fish & Richardson P.C.

(57) ABSTRACT

Solvent-based inkjet ink formulations including an organic solvent, a resin, a surfactant, and a colorant are provided. The inks have many desirable attributes such as extended decap time.

78 Claims, 1 Drawing Sheet

(56) References Cited

U.S. PATENT DOCUMENTS

| | | | |
|---|---|---|---|
| 4,500,895 A | 2/1985 | Buck et al. | |
| 4,567,213 A | 1/1986 | Bhatia | |
| 4,727,384 A | 2/1988 | Tsuda | |
| 4,825,227 A | 4/1989 | Fischbeck et al. | |
| 4,937,598 A | 6/1990 | Hine et al. | |
| 4,975,117 A | 12/1990 | Tabayashi et al. | |
| 4,978,969 A | 12/1990 | Chieng | |
| 5,006,172 A | 4/1991 | Chieng et al. | |
| 5,026,427 A | 6/1991 | Mitchell et al. | |
| 5,076,843 A | 12/1991 | Acitelli et al. | |
| 5,086,698 A | 2/1992 | Wirz | |
| 5,141,556 A | 8/1992 | Matrick | |
| 5,169,436 A | 12/1992 | Matrick | |
| 5,169,438 A | 12/1992 | Matrick | |
| 5,265,315 A | 11/1993 | Hoisington et al. | |
| 5,275,646 A | 1/1994 | Marshall et al. | |
| 5,466,287 A | 11/1995 | Lyon | |
| 5,514,207 A | 5/1996 | Fague | |
| 5,521,622 A | 5/1996 | Hock et al. | |
| 5,574,078 A | 11/1996 | Elwakil | |
| 5,594,044 A * | 1/1997 | Yang | B41J 2/01 106/31.05 |
| 5,659,346 A | 8/1997 | Moynihan et al. | |
| 5,725,641 A | 3/1998 | MacLeod | |
| 5,755,860 A * | 5/1998 | Zhu | C09D 11/50 106/31.05 |
| 5,757,391 A | 5/1998 | Hoisington | |
| 5,837,042 A | 11/1998 | Lent et al. | |
| 5,888,287 A | 3/1999 | Brown et al. | |
| 5,919,291 A | 7/1999 | Hotomi et al. | |
| 5,919,293 A | 7/1999 | Moffatt et al. | |
| 5,932,631 A | 8/1999 | Marritt et al. | |
| 5,935,308 A | 8/1999 | Siddiqui | |
| 5,973,027 A | 10/1999 | Howald et al. | |
| 5,985,016 A | 11/1999 | Tsang et al. | |
| 5,998,501 A | 12/1999 | Tustumi | |
| 6,010,564 A | 1/2000 | Zhu | |
| 6,048,914 A | 4/2000 | Goto et al. | |
| 6,069,190 A | 5/2000 | Bates et al. | |
| 6,113,679 A | 9/2000 | Adkins et al. | |
| 6,143,807 A | 11/2000 | Lin et al. | |
| 6,197,482 B1 | 3/2001 | Lobo | |
| H1967 H | 6/2001 | Woolf | |
| 6,258,155 B1 | 7/2001 | Guistina et al. | |
| 6,302,536 B1 | 10/2001 | Sarma | |
| 6,328,393 B1 | 12/2001 | Lin et al. | |
| 6,342,094 B1 | 1/2002 | Kabalnov | |
| 6,436,180 B1 * | 8/2002 | Ma | C09D 11/38 106/31.43 |
| 6,444,019 B1 | 9/2002 | Zou et al. | |
| 6,476,096 B1 | 11/2002 | Molloy et al. | |
| 6,478,863 B2 | 11/2002 | Johnson et al. | |
| 6,602,334 B1 | 8/2003 | Kaufmann | |
| 6,630,017 B2 | 10/2003 | Ma et al. | |
| 6,645,280 B1 | 11/2003 | Zhu | |
| 6,663,702 B1 | 12/2003 | Day | |
| 6,726,756 B1 * | 4/2004 | Zou | C09D 11/30 106/31.37 |
| 6,786,955 B2 | 9/2004 | Kabalnov | |
| 6,869,986 B1 * | 3/2005 | Millot | C09D 11/36 523/160 |
| 6,908,167 B2 | 6/2005 | Kitami et al. | |
| 6,989,053 B2 | 1/2006 | Jones et al. | |
| 7,041,163 B2 | 5/2006 | Roman et al. | |
| 7,052,117 B2 | 5/2006 | Bibl et al. | |
| 7,056,962 B2 | 6/2006 | Johnson et al. | |
| 7,122,077 B2 | 10/2006 | Bauer et al. | |
| 7,125,448 B2 | 10/2006 | Martin et al. | |
| 7,148,268 B2 | 12/2006 | Zhu et al. | |
| 7,309,388 B2 | 12/2007 | Zhu et al. | |
| 7,374,605 B2 | 5/2008 | Chung | |
| 7,465,759 B1 | 12/2008 | Salisbury et al. | |
| 7,632,344 B2 | 12/2009 | McGorrin | |
| 7,666,255 B2 | 2/2010 | Lauw et al. | |
| 7,771,523 B2 | 8/2010 | Jackson | |
| 7,794,033 B2 | 9/2010 | Schaeffer | |
| 7,799,121 B2 | 9/2010 | Jackson | |
| 7,838,184 B2 | 11/2010 | Fujie | |
| 8,080,102 B2 | 12/2011 | Grant | |
| 8,778,074 B2 * | 7/2014 | Brown | C09D 11/36 106/31.27 |
| 9,039,824 B2 | 5/2015 | Robertson et al. | |
| 9,284,463 B2 * | 3/2016 | Brown | C09D 11/36 |
| 9,296,910 B2 | 3/2016 | Brown | |
| 9,631,104 B2 | 4/2017 | Adamic | |
| 2002/0077383 A1 | 6/2002 | Takao et al. | |
| 2004/0228966 A1 | 11/2004 | Nigam | |
| 2005/0039634 A1 * | 2/2005 | Hermansky | C09D 11/40 106/31.59 |
| 2005/0090579 A1 | 4/2005 | Zhu et al. | |
| 2005/0199155 A1 | 9/2005 | Lauw et al. | |
| 2006/0007287 A1 | 1/2006 | Cagle et al. | |
| 2006/0038867 A1 | 2/2006 | Valentini | |
| 2006/0219133 A1 | 10/2006 | Sakamoto et al. | |
| 2007/0040880 A1 | 2/2007 | Jackson et al. | |
| 2007/0070160 A1 | 3/2007 | Takasaki | |
| 2007/0091156 A1 | 4/2007 | Jackson | |
| 2007/0120928 A1 | 5/2007 | Ma et al. | |
| 2007/0213438 A1 | 9/2007 | Mizutani et al. | |
| 2007/0225400 A1 | 9/2007 | Schmid et al. | |
| 2007/0225401 A1 | 9/2007 | Sarkisian et al. | |
| 2008/0000385 A1 | 1/2008 | Moss et al. | |
| 2008/0000386 A1 | 1/2008 | Sharmin et al. | |
| 2008/0000387 A1 | 1/2008 | Renner et al. | |
| 2008/0049086 A1 | 2/2008 | Rolly | |
| 2008/0066239 A1 | 3/2008 | Zhu et al. | |
| 2008/0081912 A1 | 4/2008 | Harada | |
| 2008/0119593 A1 | 5/2008 | Stramel | |
| 2008/0145628 A1 | 6/2008 | Oyanagi et al. | |
| 2008/0173214 A1 | 7/2008 | Oyanagi et al. | |
| 2008/0182085 A1 | 7/2008 | Oyanagi et al. | |
| 2008/0198190 A1 | 8/2008 | Schaeffer | |
| 2008/0281043 A1 | 11/2008 | Furuhata et al. | |
| 2009/0020035 A1 | 1/2009 | Jackson | |
| 2009/0056588 A1 | 3/2009 | Jackson | |
| 2009/0246377 A1 * | 10/2009 | Robertson | C09D 11/38 427/256 |
| 2010/0098860 A1 | 4/2010 | Robertson et al. | |
| 2010/0227067 A1 | 9/2010 | Namba et al. | |
| 2010/0233368 A1 | 9/2010 | Zhu et al. | |
| 2010/0255215 A1 | 10/2010 | Han et al. | |
| 2012/0127240 A1 | 5/2012 | Grant | |
| 2015/0090155 A1 | 4/2015 | Cross | |
| 2016/0177117 A1 | 6/2016 | Brown | |
| 2017/0037269 A1 | 2/2017 | Isobe | |
| 2017/0051172 A1 | 2/2017 | Adamic | |

FOREIGN PATENT DOCUMENTS

| | | | |
|---|---|---|---|
| CA | 2862378 A1 | 9/2013 | |
| CN | 102597134 A1 | 7/2012 | |
| DE | 19827710 | 12/1999 | |
| EP | 0408333 | 1/1991 | |
| EP | 1174475 | 2/2002 | |
| EP | 1857511 A1 | 11/2007 | |
| EP | 1412438 | 5/2008 | |
| EP | 2456833 A1 | 5/2012 | |
| EP | 2556123 A1 | 2/2013 | |
| EP | 2823002 A1 | 1/2015 | |
| EP | 2844711 A1 | 3/2015 | |
| EP | 2988946 A1 | 3/2016 | |
| EP | 3114179 A1 | 1/2017 | |
| EP | 3138882 A1 | 3/2017 | |
| GB | 2501748 A1 | 11/2013 | |
| IN | 201408006 | 1/2016 | |
| JP | 59142834 | 8/1984 | |
| JP | 2001/05717 | 4/2001 | |
| JP | 2001089687 A | 4/2001 | |
| KR | 2015070239 A1 | 6/2015 | |
| KR | 2015075093 A1 | 7/2015 | |
| KR | 1710503 A1 | 2/2017 | |
| KR | 1717829 A1 | 3/2017 | |
| SG | 11201405494 A1 | 10/2014 | |

(56) References Cited

FOREIGN PATENT DOCUMENTS

| WO | WO2000020521 A1 | 4/2000 |
|---|---|---|
| WO | 2001/25340 | 4/2001 |
| WO | WO2001090262 A2 | 11/2001 |
| WO | 2004/028225 | 4/2004 |
| WO | 2004/031308 | 4/2004 |
| WO | 2005/007761 | 1/2005 |
| WO | 2007003174 | 1/2007 |
| WO | 2008/011382 | 1/2008 |
| WO | 2008/064125 | 5/2008 |
| WO | WO2008130627 A1 | 10/2008 |
| WO | 2008/136795 | 11/2008 |
| WO | 2008/153203 | 12/2008 |
| WO | WO2009034394 A1 | 3/2009 |
| WO | 2009/124325 | 10/2009 |
| WO | 2010/042104 | 4/2010 |
| WO | 2010/042105 | 4/2010 |
| WO | 2011011359 A1 | 1/2011 |
| WO | 2011029122 A1 | 3/2011 |
| WO | WO2013131924 A1 | 9/2013 |
| WO | WO2013164591 A1 | 11/2013 |
| WO | WO2014173763 A1 | 10/2014 |
| WO | WO2015134020 A1 | 9/2015 |
| WO | WO2015134027 A1 | 9/2015 |
| WO | WO2015134029 A1 | 9/2015 |
| WO | WO2017018987 A1 | 2/2017 |

OTHER PUBLICATIONS

International Search Report and Written Opinion for PCT/US2010/042520, dated Nov. 23, 2010, 17 pages.

"Langmuir and Langmuir-Blodgett Films: What and How?", online, Retrieved on Nov. 29, 2010, Retrieved from KSV Instruments Oy (Helsinki, Finland) the Internet URL:http://www.ksvinc.com1LB.htm.

Peterson, 1. R., "Langmuir Blodgett Films", Journal of Physics, D 23, 4, 379-395 (1990).

Smith, R. L., "Review of Glycol Ether and Glycol Ether Ester Solvents Used in the Coatings Industry," Environmental Health Perspectives, 57, 1-4 (1984).

Office Action issued in corresponding Chinese Application No. 201080041765.X dated Jul. 1, 2013.

European Application No. 17160610.6, European Search Report, dated Jul. 5, 2017, 6 pages.

\* cited by examiner

ENJOY BY    ENJOY BY    ENJOY BY
20 JUN 08   20 JUN 08   20 JUN 08    1 min.

FIG. 1

ENJOY BY    ENJOY BY    ENJOY BY
20 JUN 08   20 JUN 08   20 JUN 08    3 min.

FIG. 2

ENJOY BY    ENJOY BY    ENJOY BY
20 JUN 08   20 JUN 08   20 JUN 08    10 min.

FIG. 3

ENJOY BY    ENJOY BY    ENJOY BY
20 JUN 08   20 JUN 08   20 JUN 08    15 min.

FIG. 4

ENJOY BY    ENJOY BY    ENJOY BY
20 JUN 08   20 JUN 08   20 JUN 08    overnight

FIG. 5

SOLVENT-BASED INKJET INK FORMULATIONS

CROSS REFERENCE TO RELATED APPLICATIONS

This application is a continuation of U.S. Utility application Ser. No. 14/301,287, filed on Jun. 10, 2014, which in turn is a continuation of U.S. Utility application Ser. No. 12/839,534, filed on Jul. 20, 2010 (now U.S. Pat. No. 8,778,074), which claims priority to U.S. Provisional Application Ser. No. 61/227,007, filed on Jul. 20, 2009. The entire contents of the foregoing applications are hereby incorporated by reference.

TECHNICAL FIELD

This disclosure relates to solvent-based inkjet ink formulations, products that include such formulations, and to methods of making and using the same.

BACKGROUND

Inkjet printing typically involves ejecting inks from a component of an inkjet printer (e.g., from one or more nozzles of a printhead) onto a substrate.

Inkjet printhead nozzles can be designed to operate within specific viscosity ranges of inks and initial evaporation can generally cause an increase in viscosity that affects the ability of the nozzle to fire a drop of ink. Clogging can be caused by evaporation of an organic solvent or water from the interface of the liquid at the surface and/or within the nozzle. The inception of clogging may cause distortion of the printed image or alphanumeric character. Eventually the clogged nozzle can fail to fire and no image will be generated. Consequently, a printer service routine, such as a printhead purge operation, may be required on a regular basis to avoid printing defects. However, it may be desirable to service the printhead as infrequently as possible, as servicing the printhead can be wasteful of ink and requires that the printer be unavailable for normal printing operations.

A typical requirement for an inkjet ink is the ability to remain in the fluid condition in a printhead nozzle opening on exposure to air, which is the so-called "decap" condition. This ability can allow a nozzle to function normally after a period of non-use. Examples of such periods of non-use may be during times of printer storage, maintenance, and/or during normal operation of infrequently utilized printhead nozzles. Decap is sometimes referred to in the art as "latency" and these two terms have been used interchangeably. The longer the decap time rating of the ink, the longer the down times that can be handled or accommodated by the printer. For example, a long decap time reduces the need for servicing the printhead.

A longer decap time can be achieved, for example, by the use of certain less volatile solvents (a solvent with a lower vapor pressure) in the ink formulation. However, such solvents do not dry quickly enough for high throughput printing operations and thus smearing of the print may result. Therefore, there is a need for inkjet inks that permit longer decap time without sacrificing other beneficial properties, such as fast drying time.

SUMMARY

The present disclosure includes systems and techniques relating to solvent-based inkjet ink formulations. The subject matter described in this specification can be embodied in an inkjet ink that includes an organic solvent, a resin, a surfactant, and a colorant.

In one aspect of the disclosure, an inkjet ink includes an organic solvent, a resin, a surfactant, and a colorant. The decap time of the ink can be at least about 1 minute.

In some implementations, the organic solvent includes a fast solvent, an intermediate solvent, a slow solvent or their mixtures. The fast solvent can be selected from the group consisting of methanol, ethanol, propanol, iso-propanol, acetone, methyl ethyl ketone, methyl isobutyl ketone, pentane, hexane, heptane, methyl acetate, ethyl acetate, propyl acetate, derivatives of the included solvents, and their mixtures. In some examples, the intermediate solvent can be selected from the group consisting of $C_{4-8}$ alcohols, 1-methoxy-2-propanol, 2-methoxy ethanol, 2-ethoxy ethanol, 1-methoxy-2-acetoxy propane, derivatives of the included solvents, and their mixtures. The slow solvent can be selected from the group consisting of tripropylene glycol monomethyl ether, tripropylene glycol-n-butyl ether, propylene glycol phenyl ether, derivatives of the included solvents, and their mixtures.

In another aspect, the disclosure describes an inkjet ink including a fast organic solvent (e.g., ethanol), a resin, a surfactant (such as a fluorosurfactant), and a colorant. The decap time of the ink can be at least about one hour.

In some implementations, the inkjet ink is substantially free of an intermediate organic solvent, a slow organic solvent, or combinations thereof.

In some implementations, the inkjet ink has a drying time of less than about 2 seconds.

In some implementations, the fast solvent is selected from the group consisting of methanol, ethanol, propanol, iso-propanol, acetone, methyl ethyl ketone, methyl isobutyl ketone, pentane, hexane, heptane, methyl acetate, ethyl acetate, propyl acetate, derivatives of the included solvents, and their mixtures.

In another aspect, the disclosure describes an inkjet ink including an intermediate organic solvent (e.g., a glycol ether having at least about four carbon atoms), a resin, a surfactant (such as a fluorosurfactant), and a colorant. The decap time of the ink can be at least about one hour.

In some implementations, the inkjet ink is substantially free of a fast organic solvent, a slow organic solvent, or combinations thereof.

In some implementations, the intermediate solvent is selected from the group consisting of $C_{4-8}$ alcohols, 1-methoxy-2-propanol, 2-methoxy ethanol, 2-ethoxy ethanol, 1-methoxy-2-acetoxy propane, ethyl lactate, derivatives of the included solvents, and their mixtures.

In another aspect, the disclosure describes an inkjet ink including a slow organic solvent, a resin, a surfactant (such as a fluorosurfactant), and a colorant. The decap time of the ink can be at least about one day.

In some implementations, the inkjet ink is substantially free of a fast organic solvent, an intermediate organic solvent, or combinations thereof.

In some implementations, the slow organic solvent includes a glycol ether (optionally having at least about 10 carbon atoms) or a dihydric alcohol (optionally having at least about 2 carbon atoms). The slow solvent can be selected from the group consisting of tripropylene glycol monomethyl ether, tripropylene glycol-n-butyl ether, propylene glycol phenyl ether, derivatives of the included solvents, and their mixtures.

In another aspect, the disclosure describes an inkjet ink including an organic solvent (such as a slow solvent), a fluorosurfactant and optionally a resin.

Implementations of the disclosure may include one or more of the following features. In some implementations, the ink can be used in a drop on demand inkjet printer (such as, thermal inkjet printer). The resin may be selected from the group consisting of rosin modified phenolic resin, phenolic resin, styrene-acrylic resin, polyketone resin, derivatives of the included resins, and their mixtures. In some implementations, the surfactant includes a non-ionic surfactant or an ionic surfactant. In some examples, the surfactant includes a fluorosurfactant, a siloxane-based surfactant, an acetylenic diol-based surfactant, a hydrocarbon-based surfactant, and/or their mixtures.

In some implementations, the fluorosurfactant is selected from the group consisting of polyethylene oxide-b-poly(tetrafluoroethylene)polymers, 2-(perfluoroalkyl)ethyl stearate, anionic lithium carboxylate fluorosurfactant, anionic phosphate fluorosurfactant, anionic phosphate surfactant, amphoteric quaternary ammonium-acetate fluorosurfactant, derivatives of the included fluorosurfactants, and their mixtures. The siloxane-based surfactant, in some examples, can be selected from the group consisting of polysiloxane-b-ethylene oxide, polysiloxane-b-propylene oxide, polysiloxane-b-propylene oxide/ethylene oxide, derivatives of the included siloxane-based surfactants, and their mixtures.

In some implementations, the acetylenic diol-based surfactant is selected from the group consisting of 2,4,7,9-tetramethyl-5-decyne-4,7-diol (TMIDD), 2,5,8,11-tetramethyl-6-dodecyne-5,8-diol, derivatives of the included acetylenic diol-based surfactants, and their mixtures.

In some implementations, the hydrocarbon-based surfactant is selected from the group consisting of polyoxyethylene (10) isooctylcyclohexyl ether, (1,1,3,3-tetramethylbutyl) phenyl-polyethylene glycol, polyethylene glycol tert-octylphenyl ether, polyoxyethylenesorbitan monopalmitate, derivatives of the included hydrocarbon-based surfactants, and their mixtures. The surfactant can be present in an amount of less than about 5% by weight of the ink, from about 0% to about 1% by weight of the ink, or from about 1% to about 5% by weight of the ink.

In some implementations, the inkjet inks may have one or more of the following attributes. The ink can have a drying time of from about 0.5 second to about 10 seconds, a viscosity of from about 1 centipoise to about 25 centipoise, and a surface tension of from about 20 dynes/cm to about 50 dynes/cm.

In some implementations, the organic solvent has a relative evaporation rate of at least about 1.0, from about 0.01 to about 0.99, or less than about 0.01. The decap time of an ink can be at least about 10 hours. In some examples, the decap time of an ink with surfactant is from about 3 to about 10 fold greater than an ink without surfactant. In some examples, the decap time of the ink is at least about 15 minutes.

Yet another aspect of the disclosure provides an inkjet ink including an organic solvent selected from the group consisting of a glycol ether, a glycol ether acetate, an alcohol, and their mixtures. The inkjet ink includes a resin, a fluorosurfactant, and a colorant.

In another aspect, the disclosure describes a method of forming a mark on a substrate (such as a porous substrate or a non-porous substrate). The method includes transferring an ink to the substrate to provide a mark on the substrate.

In another aspect, the disclosure describes an inkjet printer including a printhead, a cartridge, and a reservoir including an ink. In some implementations, the nozzle diameter of the printhead or the cartridge is from about 20 microns to about 100 microns.

In another aspect, the disclosure describes an inkjet ink including a fast organic solvent, a resin and a colorant. The ink is substantially free of an intermediate organic solvent, a slow organic solvent, or combinations thereof; and the ink has a drying time of less than about 2 seconds.

In some implementations, the ink includes a fluorosurfactant.

"Decap time" as used herein, refers to the period of time an inkjet nozzle can be left uncapped and idle before the inkjet nozzle starts to fire an ink drop improperly. Improper firing includes no drop is fired, firing with either misdirection, loss of color, or unacceptable decrease of velocity.

"Relative evaporation rate" as used herein, refers to the evaporation rate value, as determined by the ASTM method D3359, relative to n-butyl acetate.

It is to be further appreciated that certain features of the disclosure, which are, for clarity, described in the context of separate implementations, can also be provided in combination in a single implementation. Conversely, various features which are, for brevity, described in the context of a single implementation, can also be provided separately or in any suitable sub-combination.

The details of one or more implementations of the disclosure are set forth in the description below. Other features, objects, and advantages of the invention will be apparent from the description and from the claims.

BRIEF DESCRIPTION OF THE DRAWINGS

FIGS. 1-5 are a series of digital photographs of the first three individual alpha numeric codes, taken at decap times of 1 minute (FIG. 1), 3 minutes (FIG. 2), 10 minutes (FIG. 3), 15 minutes (FIG. 4), and overnight (FIG. 5), with the fast solvent F-2 in a thermal inkjet cartridge.

DETAILED DESCRIPTION

The present disclosure relates to solvent-based ink formulations. Such ink formulations can be advantageously used for improving decap time of a printhead in an inkjet printer. The decap times can be assessed by the number of marks a printhead needs to make to obtain both a legible mark (such as, of an alphanumeric code) and a perfect mark; both being determined at arm's length. The quality of the mark can be determined in comparison to a control image generated immediately after the ink is loaded into the printhead or the cartridge. The lesser the number of marks a printhead needs to make to obtain a legible and perfect mark, the better would be the quality of the ink. In some implementations of this disclosure, the number of marks a printhead needs to make to obtain both a legible mark and a perfect mark is less then about 10, e.g., less then about 9, less then about 8, less then about 7, less then about 6, less then about 5, less then about 4, less then about 3, or less then about 2. The longer decap times can be achieved, for example, by use of surfactants in inks without sacrificing other beneficial properties such as fast drying times. The solvent in an ink can be selected based on the desired dry time required for a substrate, and the ink formulation can be tailored to extend its decap time without compromising the desired dry time. The solvent-based ink formulations of the disclosure can provide a decap time from about a few seconds to about at least a few days. In some implementations, the decap time is about 1 minute, e.g., about 2 minutes, about 5 minutes, about 10 minutes, about 20 minutes, about 30 minutes, about 40 minutes, about 50 minutes, or about 60 minutes. In some implementations, the decap time is about 1 hour, e.g., about 2 hours, about 3 hours, about 4 hours, about 5 hours, about 6 hours, about 7 hours, about 8 hours, about 9 hours, about 10 hours, about 11 hours, about 12 hours, about 15 hours, about 18 hours, or about 21 hours. In some implementations, the decap time is about 1 day, e.g., about 2 days, about 3 days, about 4 days, about 5 days, about 6 days, about 7 days, about 8 days, about 9 days, or about 10 days.

In the case of inkjet printers with the inks described in this disclosure, minimal intervention and/or maintenance may be required over long idle times (i.e., decap times). For highly volatile and intermediate volatility solvents, all nozzles can recover after 1-2 images (such as an alpha numeric code) are printed after a certain decap time (this can be true for up to about 24 hours idle time); for low volatility solvents, the idle time may reach as long as 4 days after which all nozzles can be recovered without any ink purge cycles. The rapid recovery of nozzles leads to good quality images (such as, a legible image at arm's length or a perfect image). The length of time until which the ink can consistently continue to produce a legible and a perfect image in four or less attempts can be considered to be the decap time of that ink.

Ink formulations can include solvent, resin, colorant, and surfactant. Inks described herein typically have chemical and physical properties that allow the inks to be jetted onto a substrate by an inkjet printer (e.g., by one or more nozzles of a printhead of an inkjet printer).

Drying time is an important attribute for solvent-based ink formulations, especially inks using fast solvents. Though their decap time in the printhead is extended, the time required for ink printed onto a non-porous substrate to become dry to touch, remains reasonable. Dry time is measured by printing an image onto a non-porous substrate, e.g., oriented polypropylene, and allowing the printed image to be contacted by a stationary metal post at a prescribed time following printing. Any smearing of the image indicates a failure due to non-dry ink. In some implementations of this disclosure, the drying time is from about 0.5 second to about 10 seconds, e.g., from about 1 second to about 9 seconds, from about 2 seconds to about 8 seconds, from about 3 seconds to about 7 seconds, or from about 4 seconds to about 6 seconds. In some other implementations, the drying time is about 0.5 second, e.g., about 1 second, about 2 seconds, about 3 seconds, about 4 seconds, about 5 seconds, about 6 seconds, about 7 seconds, about 8 seconds, about 9 seconds, or about 10 seconds.

In some implementations, the viscosity of the inks is about 5 centipoise, e.g., about 10 centipoise, about 11 centipoise, about 12 centipoise, about 13 centipoise, about 14 centipoise, about 15 centipoise, about 20 centipoise, or about 25 centipoise. In some implementations, the viscosity of the inks is about 1 centipoise, e.g., about 2 centipoise, about 3 centipoise, or about 4 centipoise. In some implementations, the viscosity of the inks is about 10 centipoise, e.g., about 11 centipoise, about 12 centipoise, about 13 centipoise, or about 14 centipoise.

In some implementations, the ink has a surface tension of from about 20 dynes/cm to about 50 dynes/cm, e.g., from about 20 dynes/cm to about 30 dynes/cm, from about 30 dynes/cm to about 40 dynes/cm, or from about 40 dynes/cm to about 50 dynes/cm.

Solvent

Generally, the solvent can be any material that can dissolve the resin and other materials in the inkjet inks. Depending on the choice of a substrate for which an inkjet ink is targeted, a solvent (such as an organic solvent) can be selected based on the evaporation rate of a solvent. Certain non-aqueous inks have been disclosed in U.S. Patent Application Publications US 2005/0039634 (Hermansky), US 2009/0246377 (Robertson et al.), and US 2010/0098860 (Robertson et al.) and in published PCT applications WO 2010/042104 (Barreto et al.) and WO 2010/042105 (Barreto), the entire disclosures of which is incorporated herein by reference.

The evaporation rate of a solvent can typically be determined by the ASTM method D3359, and can be reported as a relative evaporation rate (RER), usually relative to n-butyl acetate. Based on this RER, the solvents can be grouped in a manner depending on the application envisioned. The solvents are categorized as a fast, intermediate and a slow solvent according to their RERs: solvents having a RER greater than 1.0 can be grouped as fast solvents; solvents having a RER from about 1.0 to about 0.01 can be grouped as intermediate solvents; and solvents having a RER less than about 0.01 can be grouped as slow solvents. The RERs can typically be correlated with the volatility of a solvent. A fast solvent typically evaporates faster and can lead to rapidly increasing viscosity of an ink. Although a solvent may be mentioned as a single chemical entity, derivatives of such solvents can include its structural isomers and other oligomers. The organic solvents described herein may either be used in an anhydrous or wet form.

Examples of fast solvents can include methanol, ethanol, propanol, iso-propanol, acetone, methyl ethyl ketone, methyl isobutyl ketone, pentane, hexane, heptane, methyl acetate, ethyl acetate, propyl acetate, tert-butyl acetate, tert-butanol, tetrahydrofuran, and their mixtures.

In some implementations, the weight % of fast solvent in inks can be about 5%, e.g., about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%. In other implementations, the weight % of fast solvent in inks can be greater than about 75%, e.g., greater than about 80%, greater than about 85%, greater than about 90%, or greater than about 95%.

Examples of intermediate solvents can include $C_{4-8}$ alcohols (e.g., butanol, pentanol, hexanol, heptanol, octanol, and the like), propylene glycol ethers (e.g., propylene glycol mono methyl ether, propylene glycol mono ethyl ether, propylene glycol n-propyl ether, propylene glycol n-butyl ether, and the like), dihydric alcohols (e.g., ethylene glycol, propylene glycol, butylene glycol, and the like), 1-methoxy-2-acetoxy propane, cyclohexanone, and their mixtures. An example of commercial intermediate solvents is "Dowanol PM propylene glycol methyl ether" available from Dow Chemical (Midland. Mich.).

In some implementations, the weight % of intermediate solvent in inks can be about 5%, e.g., about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%. In other implementations, the weight % of intermediate solvent in inks can be from about 60% to about 90%, e.g., from about 60% to about 80%, from about 70% to about 90%, or from about 70% to about 80%.

Examples of slow solvents can include, but are not limited to, glycol ethers having at least about 10 carbon atoms (e.g., at least about 11 carbon atoms, at least about 12 carbon atoms, at least about 13 carbon atoms, at least about 14 carbon atoms, or at least about 15 carbon atoms), dipropylene glycol methyl ether, dipropylene glycol methyl ether acetate, dipropylene glycol n-butyl ether, tripropylene glycol monomethyl ether, tripropylene glycol-n-butyl ether, propylene glycol phenyl ether, and their mixtures. The RERs of certain glycol ethers have been reviewed by Smith, R. L., in *Environmental Health Perspectives*, Vol. 57, pp. 1-4 (1984), the entire disclosure of which is incorporated herein by reference. An example of commercial slow solvents is "Dowanol TPM tripropylene glycol methyl ether" available from Dow Chemical (Midland. Mich.).

In some implementations, the weight % of slow solvent in inks can be about 5%, e.g., about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%. In other implementations, the weight % of slow solvent in inks can be from about 5% to about 60%, e.g., from about 5% to about 50%, from about 5% to about 40%, from about 5% to about 30%, from about 5% to about 20%, from about 20% to about 30%, from about 20% to about 40%, or from about 20% to about 50%.

In some implementations, the ink including a fast solvent is substantially free of the intermediate, or slow solvents. Substantially free refers to the weight % of a component being less than about 10%, e.g., less than about 9%, less than about 8%, less than about 7%, less than about 6%, less than about 5%, less than about 4%, less than about 3%, less than about 2%, or less than about 1%.

The solvent can be non-toxic, environmentally friendly, e.g., is EPA-approved and does not produce hazardous pollutants, stable with respect to the materials in the ink, and/or cost effective for relatively large scale manufacturing. Other solvents can be used.

Resins

The resin typically provides the ink with a desired viscosity, thermal stability, flexibility, and adhesion properties. The inks can include resins such as a rosin modified phenolic resin, a phenolic resin, a styrene-acrylic resin, a polyketone resin, derivatives of the included resins, or their mixtures. The inks can include other types of resins such as polyvinyl butyral (PVB), acrylic, polyurethane, polyamide, polyvinylpyrrolidone (PVP), or vinyl resins.

Examples of resins include, but are not limited to, acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; a rosin glycerol ester; an ethylene vinyl acetate (EVA); a polyamide resin; ethylene oxide polymer and its adducts; ethylene oxide/propylene oxide copolymer and its adducts; galbanum resin; gellan gum; ghatti gum; gluten gum; gualac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene (min. MW 37,000); polymaleic acid; polyoxyethylene derivatives; polypropylene glycol (MW 1200-3000); polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

Examples of commercial resins include Joncryl family of resins (available from BASF), Reactol K3107 (a phenolic resin from Hexion), Resin SK (a polyketone resin from Evonik), Alnovol PN320 (a novolak phenolic resin from Cytec), Laropal A81 (an aliphatic aldehyde resin from BASF), and Foral 85 hydrogenated rosin ester resin, available from Hercules Chemical Company, Inc.; 111 South Street, Passaic, N.J. 07055.

Surfactant

The surfactant (surface active agent) compound can serve to alter the surface tension of the ink composition, and can be anionic (such as sulfate esters, carboxylates, sulfonates, or phosphonates), cationic, nonionic (such as polyol based, polyglycerols based, fluorocarbon based, siloxane-based, alkyl phenol based, or polyoxyethylene based) or amphoteric (such as phosphatides, imidazoline derivatives, or betaines) surfactant compound, such as those described in "Surfactants and Interfacial Phenomena," Second Edition, M. J. Rosen, 1989, John Wiley and Sons, Inc., New York, pages 1-32, the entire disclosures of which is incorporated herein by reference.

While not intending to be bound by any particular theory, it is believed that, consistent with the principles involving Langmuir-Blodgett (LB) films and water, but herein applied to liquid inks, surfactant molecules in the inkjet ink formulations can organize rapidly at the ink/air interface within the jetting nozzle. Typically, the ink surface within the opening of the jetting nozzle, being a confined surface under tension, can cause the surfactant molecules to organize in a dense manner. Details of the teachings of Langmuir and Blodgett may be found at http://www.ksvinc.com/LB.htm ("Langmuir and Langmuir-Blodgett Films: *WHAT and HOW?*" KSV Instruments Oy (Helsinki, Finland)) or in the article entitled "Langmuir Blodgett Films." I. R. Peterson, *Journal of Physics*, D 23, 4, (1990) 379-95, the entire disclosure of which is incorporated herein by reference.

The inclusion of a surfactant within an ink formulation can lead to a barrier in the form of a layer of surfactant at the interface of air and bulk ink, thereby reducing, and preferably substantially eliminating, the ability of the solvent to evaporate from the bulk ink. By reducing the solvent evaporation rate, and preferably entirely preventing solvent evaporation of the ink formulations, the decap time can be increased. At the same time, once an inkjet ink is jetted onto a substrate, fast evaporation (i.e., fast drying time) can occur because the surfactant molecules can spread out over a larger surface area instead of being confined to a surface that is under tension.

Fluorosurfactants are surfactants that can either be ionic (with the fluorine-containing moiety being part of either the cationic or the anionic part) or nonionic (such as fluorocarbon chain-containing alcohols). The fluorosurfactants can be ethoxylated surfactants (i.e., polyethyleneoxide modified) or polytetraflouroalkylene surfactants. Ethoxylated surfactants include one or more of ethylene oxide monomeric units. Polytetraflouroalkylene surfactants include one or more of tetraflouroalkylene units. Examples of fluorosurfactants include polyethylene oxide-b-poly(tetrafluoroethylene) polymers, 2-(perfluoroalkyl)ethyl stearate, anionic lithium carboxylate fluorosurfactant, anionic phosphate fluorosurfactant, anionic phosphate surfactant, amphoteric quaternary ammonium-acetate fluorosurfactant, fluoroaliphatic polymeric esters, their derivatives, and their mixtures. Examples of commercial fluorosurfactants include Zonyl family of fluorosurfactants (e.g., Zonyl FSO 100, Zonyl FSN, Zonyl FTS) and Capstone family of fluorosurfactants (available from DuPont Chemicals, Wilmington, Del.), or Fluorad FC 170-C, FC171, FC430 and FC431 available from 3M of St. Paul, Minn. Hermansky (see above) discloses the complete drying of the inks in the presence of Zonyl FSX surfactant.

Siloxane-based surfactants are surfactants which can be copolymers of silyl ethers and epoxy (ethylene oxide, propylene oxide) oligomers or polymers. Examples of siloxane-based surfactants include polysiloxane-b-ethylene oxide, polysiloxane-b-propylene oxide, polysiloxane-b-propylene oxide/ethylene oxide, their derivatives, and their mixtures. Examples of commercial siloxane-based surfactants include copolymers such as SILWET® copolymers including Silwet L-7604, available from GE Silicones; Troysol Q-148 and S366 available from Troy Chemical.

Acetylenic diol-based surfactants are surfactants which can be acetylenic diols comprising hydrophobic groups at the end of the acetylenic spacer and hydrophilic and/or hydrophobic ethers hanging off of the hydroxyl groups. Examples of acetylenic diol-based surfactants include, 2,4,7,9-tetramethyl-5-decyne-4,7-diol (TMDD), 2,5,8,11-tetramethyl-6-dodecyne-5,8-diol, their derivatives, and their mixtures. Examples of commercial acetylenic diol-based surfactants include Dynol series (Dynol 604) and Surfynol series (Surfynol 104, 420, 465, 485, TG-E, SE, etc.) available from Air Products.

Hydrocarbon-based surfactants are surfactants which can be polyoxyethylenated alkyl phenols (APE type), polyoxyethylenated short chain alcohols (AE type), or long chain organic acid esters. Examples of hydrocarbon-based surfactants include polyoxyethylene (10) isooctylcyclohexyl ether, (1,1,3,3-tetramethylbutyl)phenyl-polyethylene glycol, polyethylene glycol tert-octylphenyl ether, polyoxyethylenesorbitan monopalmitate, their derivatives, and their mixtures. Examples of commercial hydrocarbon-based surfactants include Triton X Series and Tergitol Series both from Dow Chemical; the TWEEN Series from ICI Americas; and the Igepal Series from Hallstar.

The surfactants can be present in varying amounts in the inkjet ink, depending on the other ingredients. The surfactants, as a weight % of the ink, can be present from about 0% to about 5%, e.g., from about 0% to about 1%, from about 1% to about 2%, from about 2% to about 3%, from about 3% to about 4%, or from about 4% to about 5%. In some implementations, the surfactants, as a weight % of the ink, can be present from about 1.1% to about 5%, e.g., from about 1.1% to about 2%, from about 1.1% to about 3%, or from about 1.1% to about 4%. In some implementations, the surfactants, as a weight % of the ink, can be present less than about 5%, e.g., less than about 4%, less than about 3%, less than about 2%, less than about 1%, or less than about 0.5%. The decap time of an ink with a surfactant can increase from about 3 to about 10 fold compared to an ink without a surfactant. In some implementations, the decap time of an ink with a surfactant can increase about 3 fold, e.g., about 4 fold, about 5 fold, about 6 fold, about 7 fold, about 8 fold, about 9 fold, or even about 10 fold compared to an ink without a surfactant.

The addition of surfactants can provide an extended decap time without compromising the drying time on a substrate. Surfactants can alter the viscosity of the ink formulations to some extent and can further prevent the viscosity of the inks in the reservoir to alter minimally. For example, the viscosity of the inks can be from about 1 centipoise to about 25 centipoise, e.g., from about 5 centipoise to about 20 centipoise, or from about 10 centipoise to about 15 centipoise. The surfactants can alter the surface tension of the inks at the air-ink interface during idle time and can aid in decreasing the solvent evaporation rate.

Colorant

The ink may include a colorant, which provides color to the ink. The ink can contain a sufficient amount of a colorant that the ink has color, but not so much as to interfere with other desirable qualities, such as surface tension or viscosity.

An ink can include one or more colorants (e.g., one or more pigments, one or more dyes, or their mixtures). Colorants can provide an ink with, for example, a desired color and/or opacity. Exemplary colors can include black, cyan, magenta, yellow, red, blue, green, brown, or their combinations.

Examples of suitable pigments include Color Index Pigment Black 7; Pigment Blue 15; Pigment Red 112, 146, 170 and 208; Pigment Yellow 17 and 83; Pigment Green 7; carbon black, graphite; and pigment white titanium dioxide. Additional examples are disclosed in, e.g., U.S. Pat. No. 5,389,133, the entire disclosures of which is incorporated herein by reference. The pigment may also have a modifying group on its surface, such as an oxygen-containing functionality (e.g., a carboxyl or phenol group). An example of a commercially available pigmented colorant can be "Special Black 4A" available from Evonik Degussa (Germany).

Examples of dyes include Orasol Pink 5BLG, Black RLI, Blue 2GLN, Red G, Yellow 2GLN, Blue GN, Blue BLN, Black CN, and Brown CR (all available from Ciba-Geigy, Inc., Mississauga, Ontario); Morfast Blue 100, Red 101, Red 104, Yellow 102, Black 101, and Black 108 (all available from Morton Chemical Company, Ajax, Ontario); and a mixture thereof.

Other Modifying Agents in the Formulations

The inkjet inks can contain smaller amounts of other ingredients without hindering the desired properties of the inks. Such ingredients can include dispersants, anti-foaming agents, wetting agents, viscosity modifiers, and light stabilizers.

Ink Preparation

A pigment concentrate can be prepared by combining a pigment with an amount of at least some (e.g., all) components of an ink to be prepared to provide a concentrate having a higher concentration of pigment than the final ink. The pigment concentrate can improve pigment grinding and reduce process time.

While not intending to be bound by any particular theory, it is believed that in the pigment concentrate, the number density of pigment particles is increased, which allows for more particle-particle and particle-grinding media collisions, which in turn decreases the period of time needed to reach a desired particle size. Additionally, in the concentrate, the particles have higher odds of coming in contact with dispersant/surfactant molecules, if present. These materials can adsorb onto the surface of the particles so that the particles with reduced size do not agglomerate. By increasing the odds of particle-dispersant collisions, the grind time can be reduced and the particle size stability can be increased.

For example, to prepare a carbon black pigment concentrate, the amount of dispersant to be used can be calculated based on the desired pigment particle size, the calculated pigment surface area (supplied by the pigment manufacturer), or both. A fluid vehicle and dispersant can be charged into an appropriate vessel. The vehicle and dispersant can be mixed until fully blended (some gentle heating may be necessary if the dispersant is a solid). The vehicle/dispersant mixture can be moved to a high shear mixer and the pigment can be slowly charged. The materials can be milled to obtain a pigment concentrate.

For a liquid ink, all liquid ingredients can be mixed and, if necessary, the ink can be filtered through a desired filter.

Printers

A drop-on-demand inkjet printer can be defined as a piezo driven system or a thermally driven system. In the case of the piezo system, a printer consists of electronics and software necessary to control an ink reservoir and a piezo driven inkjet assembly (an array of inkjet nozzles arranged in a regular pattern), where a reservoir is either directly or indirectly attached to a printing assembly. Direct attachment results in an integral printhead whereas indirect attachment results in a jetting assembly located some distance away from the reservoir with the two components connected by an ink umbilical that delivers ink to the inkjet jetting assembly. In the case of thermal inkjet system, a printer consists of electronics and software necessary to drive a fully integrated reservoir and jetting assembly in a stand-alone holder or ganged together to increase image swath or resolution. However, there are instances where a "bulk" ink reservoir can be used to feed ink to a thermal inkjet assembly through an umbilical. The electronics and software controls in both cases dictate when a drop is to be ejected from the inkjet assembly based on the desired image to be printed.

Drop on demand printers are described in more detail, e.g., in U.S. Pat. No. 5,265,315; Thermal inkjet printheads are described, e.g., in U.S. Pat. Nos. 4,727,384 and 4,500,895; and, piezoelectric inkjet printheads are described in, e.g., U.S. Pat. Nos. 4,825,227, 4,937,598, 5,659,346, 5,757,391, and 7,052,117. The entire disclosures of these patents are incorporated herein by reference.

Manufacturers of piezo inkjet assemblies include Dimatix, Xaar, and Xerox. Manufacturers of thermally driven inkjet assemblies integrated to a reservoir (commonly referred to as a thermal inkjet cartridge) include Hewlett Packard, Lexmark, and Olivetti.

The inks described can be utilized in either a piezo driven or a thermally driven inkjet assembly by adjusting the viscosity of an ink. In general, piezo driven inkjet assemblies can utilize inks with a viscosity between 7 cPs and 25 cPs depending on the nozzle geometry, whereas thermally driven inkjet assemblies can utilize inks with a viscosity between 1 cPs and 5 cPs depending on the nozzle geometry.

Inkjet assemblies, both piezo and thermally driven systems, can be manufactured (such as by laser drilling, chemical etching) with different nozzle diameters depending on the desired drop volume. In general, smaller diameter nozzles can result in ejection of lower drop volumes and larger diameter nozzles can result in ejection of higher drop volumes. In the case of thermal inkjet assemblies, multiple nozzle diameters can be integrated into a single jetting assembly such that multiple drop volumes can be ejected from a single cartridge. In some implementations, nozzle diameter can be from about 20 microns to about 100 microns, e.g., from about 30 microns to about 100 microns, from about 40 microns to about 100 microns, from about 50 microns to about 100 microns, from about 60 microns to about 100 microns, from about 70 microns to about 100 microns, from about 80 microns to about 100 microns, or from about 90 microns to about 100 microns.

Printing Process

Inks can be jetted by either thermal inkjet cartridges or piezo drop on demand printheads. Examples of thermal inkjet cartridges are those commercially available from Hewlett Packard (such as HP45); Lexmark (such as Model 34); and Olivetti (such as IN501). Examples of piezo drop on demand printheads can include commercially available models from Dimatix (such as Q or S Class) and Xaar (such as a XJ500). Examples of thermal inkjet printers that would allow solvent-based inks to be jetted are: DeskJet model 710 from Hewlett Packard, the model Z845 from Lexmark, and the model Simple_Way from Olivetti. Examples of piezo-based printers that would allow solvent-based inks to be jetted are: Markem-Imaje models 5200 and 4040. To print inks, an ink is loaded into a reservoir where it is either pumped or fed by gravity to a jetting chamber of a cartridge or printhead. In the case of the thermal inkjet cartridge, a liquid ink is ejected from a printhead by being rapidly heated, causing a rapid phase change from liquid to gas, thus causing a rapid volume expansion and subsequently causing a droplet to eject from an orifice. In the case of a piezo-based device a liquid ink is ejected from a printhead by activation of a piezo transformer (PZT), which causes a pressure wave to be exerted upon the ink and an ink droplet can be ejected from an orifice. Both devices are referred to as drop-on-demand since a droplet of ink is ejected only when a heater or PZT material is activated. Each cartridge or printhead contains an array of several orifices across its width. Activation of each orifice in such an array is performed methodically by the printer such that an image is formed drop-wise on a substrate, which is positioned a short distance from the orifice array. The printers are designed such that an orifice array and a substrate move relative to one another in order to form an image. In continuous ink jet printing, a continuous stream of conductive ink droplets is ejected from a nozzle. The droplets are electrostatically deflected to address several vertical pixels as the substrate moves relative to the nozzle. Ink droplets that are not intended or needed to form a desired image on the substrate are fully deflected into a gutter and recycled to the ink supply. CIJ inks contain an additive (such as, a conductive aid) that imparts conductivity and allows the droplets to be deflected. The process of jetting ink droplets continuously and directing unneeded drops to the gutter allows the CIJ systems to utilize fast evaporating solvents without concern for decap and nozzle clogging, as the nozzle is effectively never idle during operation.

In the case of inks that utilize fast evaporating solvents, upon contacting a substrate, which is typically non-porous and at room temperature, a solvent in the liquid ink evaporates and a film forms on the substrate. In the case of inks that utilize intermediate evaporating solvents, upon contacting a substrate, which is typically semi-porous and at room temperature, a liquid ink dries by a combination of evaporation and absorption. In the case of inks that utilize slow evaporating solvents, upon contacting a substrate, which is typically porous and at room temperature, a liquid ink flows rapidly into the void spaces in the substrate and dries primarily by absorption. In all three cases of solvents, it is possible in some settings to assist drying of the inks by adding an in-line drying capability. In some implementations of printing using the described inks, the drying of the inks on the substrate is unassisted (such as without the use of external drying mechanisms e.g., fans).

Substrates

The inks can be applied to either porous or non-porous substrates such as flexible packaging films (for example, polypropylene, polyethylene, polyethylene terephthalate, polystyrene, or poly(lactic acid) films), rigid plastic materials (for example polypropylene, polyethylene, polyethylene terephthalate, polystyrene, poly(lactic acid), polyvinyl-chloride materials), corrugated cardboard (for example, bleached, unbleached, and coated cardboard), boxboard (for example, glossy coated, matte coated, and uncoated boxboards), bottle materials (for example, glass, polyethylene terephthalate, polyethylene, polypropylene, and poly(lactic acid) materials).

Additionally, as indicated in each of Examples 1 through 12, the solvent-based ink formulations can be tailored for a certain operating temperature, for a certain viscosity, and for a certain nozzle diameter, which defines the surface under tension.

Unless otherwise defined, all technical and scientific terms used herein have the same meaning as commonly understood by one of ordinary skill in the art of solvent-based inkjet inks. Although methods and materials similar or equivalent to those described herein can be used in the practice or testing, suitable methods and materials are described below. In case of conflict, the present specification, including definitions, will control. In addition, the materials, methods, and examples are illustrative only and not intended to be limiting.

EXAMPLES

Example 1: Procedure for Making Inks and Pigmented Concentrate

Procedure for Making Inks:
Step 1:

A resin and solvent are measured into a glass beaker and the solution is stirred (with either a magnetic stirrer or a propeller blade at about 200-400 rpm) at room temperature until homogeneous. This will typically require between 10 and 200 minutes. The surfactant is measured into a separate vessel and slowly added to the homogenous, stirring resin and solvent solution. The mixing was continued until homogeneous, but not for less than about 10 minutes. The colorant is measured into a separate vessel. If colorant is a dye, no prior processing is necessary. If colorant is a pigmented dispersion, see Step 1A for the preparation of pigmented concentrate. The colorant is added slowly to the homogenous, stirring solution and continued to mix until colorant has been fully incorporated into solution, but not for less than about 20 minutes. The viscosity of ink was measured using Brookfield DV series viscometer. The ink was loaded into a syringe and filtered through a 1.0 micron syringe filter (e.g., Whatman Puradisc® 25GD; with GMF-150 media; p/n 6783-2510) placed on the exit of the syringe. The filtered ink can now be loaded into printer reservoir.

Step 1A:
Procedure for Making Pigmented Concentrate:

The solvent was measured into a stainless steel vessel and stirred using a high speed Cowles® type blade at about 1000 rpm. The dispersant was measured into a separate vessel and slowly added to the mixing solvent until homogeneous, but not for less than about 15 minutes. The pigment was measured into a separate vessel and slowly added to the mixing solvent until all of the pigment has been wetted by the solution. The mixer speed was increased to about 2000-5000 rpm and mixed for about 30 minutes until the solution was homogeneous and all of the pigment was wetted. The mixer was stopped and the stainless steel vessel moved to Basket-style media mill, Hockmeyer Micro; 1/16 gallon model. The media mill was charged with appropriate media such as YTZ 0.4-0.6 mm ceramic material and processed at about 3000-4000 rpm for not less than 2 hours or until solution passes easily through a 1 micron filter (e.g., What-man Puradisc® 25GD; with GMF-150 media; p/n 6783-2510). This pigmented concentrate was used in Step 1 above. Two pigmented concentrates were prepared. Pigmented Concentrate-1 containing 61.2% glycol ether TPM, 10.2% Solsperse 32000, and 28.6% Special Black 4A Pigment. Pigmented Concentrate-2 containing 72.4% glycol ether TPM, 7.3% Solsperse 32000, and 20.3% Special Black 4A Pigment.

Example 2: Inks with Fast Solvents

The inks of the formulation F-1 to F-8 (Table 1) were prepared according to the method described in Example 1. Each column indicates the weight % of the ingredient in the final formulation. The viscosity of the inks in Table 1 were measured using Brookfield DV Series Viscometer with a ULA Adapter at 72° F. using spindle 00 operating at 60 rpm spindle speed. The dry time was performed as described: Ink was loaded into a previously unfilled thermal inkjet cartridge, the printhead was purged and confirmed that all nozzles were operable. An image was printed on a non-porous substrate and good image quality was immediately confirmed. The web speed was set at prescribed rate and the fixed post moved into position. An image was printed on a substrate and images allowed to pass by the fixed post. The images were inspected for signs of smear that would indicate wet ink. The test was performed at 150 dpi in process direction and 600 dpi in the cross process direction and dry time was recorded.

TABLE 1

Inks with fast solvents

| Ingredient | F-1 | F-2 | F-3 | F-4 | F-5 | F-6 | F-7 | F-8 |
|---|---|---|---|---|---|---|---|---|
| Ethanol (anhydrous) | 93.4 | 91.4 | 91.4 | 91.3 | 90.0 | 91.4 | 92.4 | 90.4 |
| Reactol K3107 | 2.9 | 2.9 | 2.9 | — | — | 2.9 | 2.9 | 2.9 |
| Alnovol PN430 | — | — | — | 3.0 | — | — | — | — |
| Joncryl 682 | — | — | — | — | 4.5 | — | — | — |
| Orasol Black RLI | 3.7 | 3.7 | 3.7 | 3.7 | 3.5 | 3.7 | 3.7 | 3.7 |
| Zonyl FSO100 | 0.0 | 2.0 | — | 2.0 | 2.0 | — | — | — |
| Zonyl FSN | — | — | 2.0 | — | — | — | — | — |
| Silwet L7604 | — | — | — | — | — | — | 1.0 | — |
| Triton X-100 | — | — | — | — | — | — | — | 3.0 |
| Dynol 604 | — | — | — | — | — | 2.0 | — | — |
| Viscosity (cPs at 72° F. | 1.52 | 1.55 | 1.94 | 1.70 | 1.65 | 1.71 | 1.72 | 1.79 |
| Dry time @ 150 dpi (s) | 0.5 | 1.5 | 1.25 | >2 | 1.0 | 0.5 | 0.5 | 1.5 |

Example 3: Decap Testing for Fast-Solvents

Ink was loaded into a previously unfilled thermal inkjet cartridge, the printhead was purged and a control image consisting of 24 individual alpha numeric codes (in FIGS. 1-5, "ENJOY BY 20 JUN 08" represents an alpha numeric code) was immediately generated. The printer was allowed to sit idle for one minute and then an image consisting of 24 individual alpha numeric codes was generated. The number of codes that had to be generated to obtain both a legible code at arm's length (L*) and a perfect code (P*) was recorded. The printer was allowed to sit idle for 3 minutes and then an image consisting of 24 individual alpha numeric codes was generated. This line of testing was continued for 5, 10, 15, 60 minutes and overnight. The results are presented in Table 2. For the ink F-1, after 1 min. of decap time, the eighteenth code was legible whereas none of the codes were perfect. For the ink F-4, after 1 min. of decap time, the second code was both legible and perfect.

FIGS. 1-5 are each the first three individual alpha numeric codes generated with the ink F-2 after 1 min. (FIG. 1), 3 min. (FIG. 2), 10 min. (FIG. 3), 15 min. (FIG. 4), and overnight (FIG. 5) decap times. The alpha numeric code on the right in each Figure is the first image generated. In FIG. 1, the first legible image was the second image while the first perfect image was the third image. In Table 2, the ink F-2 continues to produce a legible and a perfect image for a decap time of at least about overnight (16 hours) while the ink F-6 was determined to produce a legible and a perfect image for a decap time of about 1 min.

TABLE 2

Decap Test Results

| Time (min.) | F-1 L* | F-1 P* | F-2 L* | F-2 P* | F-3 L* | F-3 P* | F-4 L* | F-4 P* | F-5 L* | F-5 P* | F-6 L* | F-6 P* | F-7 L* | F-7 P* | F-8 L* | F-8 P* |
|---|---|---|---|---|---|---|---|---|---|---|---|---|---|---|---|---|
| 1 | 18 | >24 | 2 | 3 | 1 | 3 | 2 | 2 | 5 | 8 | 1 | 1 | >24 | >24 | 12 | 14 |
| 3 | >24 | >24 | 3 | 4 | 2 | 3 | 2 | 2 | n/a | n/a | 2 | 20 | 18 | >24 | 9 | 11 |
| 5 | >24 | >24 | 1 | 4 | 1 | 3 | 1 | 2 | n/a | n/a | 11 | 14 | 19 | >24 | 11 | 12 |
| 10 | >24 | >24 | 1 | 2 | 2 | 2 | 1 | 2 | 5 | 8 | 10 | 15 | 20 | 24 | 14 | 20 |
| 15 | >24 | >24 | 1 | 1 | 2 | 2 | 1 | 2 | 2 | 3 | 12 | 10 | 17 | 19 | 11 | 14 |
| 60 | >24 | >24 | 1 | 1 | 1 | 1 | 2 | 2 | 1 | 1 | 7 | 10 | 18 | 20 | 9 | 10 |
| overnight | >24 | >24 | 1 | 1 | 2 | 2 | 1 | 1 | 1 | 1 | >24 | >24 | >24 | >24 | 20 | 22 |

Example 4: Inks with Fast Solvents

The inks of the formulation F-9 to F-14 (Table 3) can be prepared according to the method described in Example 1. Each column indicates the weight % of the ingredient in the final formulation.

TABLE 3

Inks with fast solvents

| Ingredient | F-9 | F-10 | F-11 | F-12 | F-13 | F-14 |
|---|---|---|---|---|---|---|
| Ethanol | 88-96 | 88-96 | 88-96 | 88-96 | 88-96 | 88-96 |
| Reactol K3107 | 2-4 | — | — | 2-4 | — | — |
| Alnovol PN430 | — | 2-4 | — | — | 2-4 | — |
| Joncryl 682 | — | — | 2-4 | — | — | 2-4 |
| Orasol Black RLI | 3-5 | 3-5 | 3-5 | 3-5 | 3-5 | 3-5 |
| Zonyl FSO100 | 0-3 | 0-3 | 0-3 | — | — | — |
| Zonyl FSN100 | — | — | — | 0-3 | 0-3 | 0-3 |

Example 5: Inks with Intermediate Solvents

The inks of the formulation I-1, I-2, and I-6 (Table 4) were prepared according to the method described in Example 1. Each column indicates the weight % of the ingredient in the final formulation. The viscosity of the inks in Table 4 were measured using Brookfield DV Series Viscometer with a ULA Adapter at 72° F. using spindle 00 operating at 30 rpm spindle speed.

TABLE 4

Inks with intermediate solvents

| Ingredient | I-1 | I-2 | I-6 |
|---|---|---|---|
| PM solvent | 77.7 | 76.2 | 76.2 |
| Reactol K-3107 | 19.7 | 19.3 | 19.3 |
| Orasol Black RLI | 2.6 | 2.5 | 2.5 |
| Zonyl FSO 100 | 0 | 2 | 0 |
| Zonyl FSN 100 | 0 | 0 | 2 |
| Viscocity, cPs at 40° C. | 10.4 | 10.7 | 10.6 |

Example 6: Decap Testing for Intermediate Solvents

Ink was loaded into a Dimatix Skywalker 128/50 printhead. The printhead was purged and a control image was immediately generated. The printer was allowed to sit idle for 30 seconds and then an image consisting of a matrix of individual dots representing single nozzle firings was generated. The printer was allowed to sit idle for 1 minute and then a series of images were generated. This line of testing was continued for 3, 5, 10, 15, and 30 minutes. The results are presented in Table 5.

TABLE 5

Decap Test Results

| Idle time (min) | No. of drops fired before full recovery of jet | |
|---|---|---|
| | I-1 | I-2 |
| 0.5 | 104 | 30 |
| 1 | 140 | 34 |
| 3 | 176 | 34 |
| 5 | 175 | 17 |
| 10 | 189 | — |
| 15 | — | 9 |
| 30 | 248 | 4 |

Example 7: Inks with Intermediate Solvents

The inks of the formulations I-3 to I-5 (Table 6) can be prepared according to the method described in Example 1. Each column indicates the weight % of the ingredient in the final formulation.

TABLE 6

| Inks with intermediate solvents | | | |
|---|---|---|---|
| Ingredient | I-3 | I-4 | I-5 |
| PM solvent | 72-80 | 72-80 | 72-80 |
| Reactol K-3107 | 17-21 | — | — |
| Alnovol PN430 | — | 17-21 | — |
| Joncryl 682 | — | — | 17-21 |
| Orasol Black RLI | 2-3 | 2-3 | 2-3 |
| Zonyl FSO 100 | 0-3 | 0-3 | 0-3 |

Example 8: Inks with Slow Solvents

The inks of the formulation S-1 to S-4 (Table 7) were prepared according to the method described in Example 1. Each column indicates the weight % of the ingredient in the final formulation. The viscosity of the inks in Table 7 were measured using Brookfield DV Series Viscometer with a small sample adapter at 40° C. using spindle 18 operating at 60 rpm spindle speed.

TABLE 7

| Inks with slow solvents | | | | |
|---|---|---|---|---|
| Ingredient | S-1 | S-2 | S-3 | S-4 |
| Dowanol TPM tripropylene glycol methyl ether | 39 | 34.5 | 40.5 | 24 |
| Pigmented Concentrate-2, (20.3% by weight in TPM) | 41 | 37 | 45 | 41 |
| Foral 85 solution (35% by weight in TPM) | 20 | 27 | 13 | 20 |
| Zonyl FSO100 | 0 | 1.5 | 1.5 | — |
| Surfynol 104 (20% solution in TPM) | — | — | — | 15 |
| Viscosity, cPs at 40° C. | 11.7 | 11.6 | 12.3 | 11.8 |

Example 9: Inks with Slow Solvents

The inks of the formulation S-5 to S-12 (Table 8) were prepared according to the method described in Example 1. Each column indicates the weight % of the ingredient in the final formulation. The viscosity of the inks in Table 8 were measured using Brookfield DV Series Viscometer with a small sample adapter at 40° C. using spindle 18 operating at 60 rpm spindle speed.

TABLE 8

| Inks with slow solvents | | | | | | | | |
|---|---|---|---|---|---|---|---|---|
| Ingredient | S-5 | S-6 | S-7 | S-8 | S-9 | S-10 | S-11 | S-12 |
| Dowanol TPM tripropylene glycol methyl ether | 30.8 | 30.5 | 29.5 | 28.5 | 26 | 25.9 | 41.6 | 9 |
| Joncryl 682 (acrylic copolymer) 35% solution in TPM | 17 | 17 | 17 | 17 | 13.3 | 6.2 | 8.0 | 17 |
| Pigmented Concentrate-1 | 51.5 | 51.5 | 51.5 | 51.5 | — | — | — | — |
| Pigment Concentrate-2, (20.3% carbon black in TPM) | — | — | — | — | 59.5 | 65.1 | 49 | 71 |
| Zonyl FSO100 | 0.7 | 1 | 2 | 3 | 1.2 | 2.8 | 1.4 | 3 |
| Viscosity, cPs at 40° C. | 18.1 | 18.9 | 19.6 | 20.4 | 17 | 15.7 | 12.9 | 18.6 |

Ingredients are included as weight %

Example 10: Decap Test for the Slow Solvent Ink

The Markem-Imaje Model 5600 printer was loaded with the ink to be tested. The system was purged and a test image, showing the proper function of each nozzle, was made. This test image allows the user to visually determine if any given nozzle is operating or not and if its directionality and volume are proper. This jetting test was performed to assess initial nozzle function, then allowed the printer to sit idle. After a number of days (in this instance, either 1 day or 4 days), a jetting test was performed to assess the nozzle function; if fewer nozzles were functional than in the initial jet test, an ink purge was performed. The nozzle performance was reassessed after each successive jet test until all of the original nozzles were functioning. The number of purges required to recover all nozzles was recorded (Table 9).

TABLE 9

| Decap Test Results | | |
|---|---|---|
| | number of purges | |
| No. of days | S-1 | S-2 |
| 1 | 1 | 0 |
| 4 | 4 | 0 |

Example 11: Inks with Slow Solvents

The inks of the formulation S-13 to S-16 (Table 10) can be prepared according to the method described in Example 1. Each column indicates the weight % of the ingredient in the final formulation.

TABLE 10

| Inks with slow solvents | | | | |
|---|---|---|---|---|
| Ingredient | S-13 | S-14 | S-15 | S-16 |
| Dowanol TPM tripropylene glycol methyl ether | 20-50 | 20-50 | 5-35 | 5-35 |
| Pigmented Concentrate-2, (20.3% by weight in TPM) | 30-50 | 30-50 | 45-75 | — |
| Pigmented Concentrate-1 | — | — | — | 45-55 |
| Foral 85 solution (35% by weight in TPM) | 10-35 | 10-35 | — | — |
| Joncryl 682 (acrylic copolymer) 35% solution in TPM | — | — | 5-20 | 5-20 |
| Zonyl FSO100 | 0-3 | 0-3 | 0-3.5 | 0-3.5 |
| Surfynol 104 (20% solution in TPM) | 0-3 | 0-3 | 0-3.5 | 0-3.5 |

Example 12: Alternate Decap Testing for Intermediate Solvents

Ink was loaded into a Dimatix Skywalker 128/50 printhead, the printhead was purged and a control image consisting of 24 individual alpha numeric codes was immediately generated. The printer was allowed to sit idle for 30 seconds and then an image consisting of 24 individual alpha numeric codes was generated. The number of times the codes had to be generated to obtain both a legible code at arm's length (L*) and a perfect code (P*) was recorded. The printer was allowed to sit idle for 1 minute and then an image consisting of 24 individual alpha numeric codes was generated. This line of testing was continued for 3, 5, 10, 15, 60 minutes and overnight. The results are presented in Table 11.

TABLE 11

Decap Test Results

| Idle time | I-1 | | I-2 | | I-6 | |
|---|---|---|---|---|---|---|
| (min) | L* | P* | L* | P* | L* | P* |
| 0.5 | 2 | 2 | 2 | 3 | 2 | 3 |
| 1 | 2 | 3 | 1 | 1 | 2 | 3 |
| 3 | 3 | 4 | 2 | 3 | 2 | 3 |
| 5 | 4 | 6 | 3 | 5 | 2 | 3 |
| 10 | 4 | 6 | 3 | 4 | 1 | 2 |
| 15 | >24 | >24 | 3 | 6 | 1 | 1 |
| 60 | >24 | >24 | 1 | 2 | 1 | 1 |
| overnight | >24 | >24 | 2 | 2 | 1 | 1 |

A number of implementations have been described. Nevertheless, it will be understood that various modifications can be made without departing from the spirit and scope of the disclosure. Accordingly, other implementations are within the scope of the following claims.

For example, while ethanol has been described for fast organic solvent, propanol or butanol can be used.

All of the features disclosed in this specification may be combined in any combination. Each feature disclosed in this specification may be replace by an alternative feature serving the same, equivalent, or similar purpose. Thus, unless expressly stated otherwise, each feature disclosed is only an example of a generic series of equivalent or similar features.

What is claimed is:

1. An inkjet ink, comprising:
    a first organic solvent, the first organic solvent being a fast organic solvent;
    a first resin;
    a first surfactant, the first surfactant being a fluorosurfactant; and
    a first colorant;
    wherein the ink is a thermal inkjet ink, has a drying time of less than about 10 seconds, and has a decap time of at least about one minute.

2. The ink of claim 1, wherein the ink has a decap time of at least about 5 minutes.

3. The ink of claim 1, wherein the ink has a decap time of at least about 15 minutes.

4. The ink of claim 1, wherein the ink has a decap time of at least about 30 minutes.

5. The ink of claim 1, wherein the ink has a drying time of less than about 8 seconds.

6. The ink of claim 1, wherein the ink has a drying time of less than about 6 seconds.

7. The ink of claim 1, wherein the ink has a drying time of less than about 2 seconds.

8. The ink of claim 1, wherein the fast organic solvent is selected from the group consisting of methanol, ethanol, propanol, iso-propanol, acetone, methyl ethyl ketone, methyl isobutyl ketone, pentane, hexane, heptane, methyl acetate, ethyl acetate, propyl acetate, and combinations thereof.

9. The ink of claim 1, wherein the fast organic solvent is ethanol.

10. The ink of claim 1, wherein the ink comprises greater than about 75% of the first organic solvent.

11. The ink of claim 1, wherein the ink comprises a second solvent in addition to the first organic solvent.

12. The ink of claim 11, wherein the second solvent is an intermediate solvent.

13. The ink of claim 1, wherein the first resin is selected from the group consisting of rosin modified phenolic resins, phenolic resins, styrene-acrylic resins, polyketone resins, polyvinyl butyral resins, acrylic resins, polyurethane resins, polyamide resins, polyvinylpyrrolidone resins, vinyl resins, and combinations thereof.

14. The ink of claim 1, wherein the ink further comprises a second resin in addition to the first resin.

15. The ink of claim 1, wherein the first surfactant is a fluorosurfactant, a siloxane-based surfactant, an acetylenic diol-based surfactant, a hydrocarbon-based surfactant, or a combination thereof.

16. The ink of claim 15, wherein the first surfactant is a fluorosurfactant.

17. The ink of claim 1, wherein the fluorosurfactant is selected from the group consisting of polyethylene oxide-b-poly(tetrafluoroethylene)polymers, 2-(perfluoroalkyl)ethyl stearate, anionic lithium carboxylate fluorosurfactant, anionic phosphate fluorosurfactant, amphoteric quaternary ammonium-acetate fluorosurfactant, and a combination thereof.

18. The ink of claim 1, wherein the fluorosurfactant is a polymeric fluorosurfactant.

19. An inkjet ink, comprising:
    a first organic solvent, the first organic solvent being a fast organic solvent;
    a first resin;
    a first surfactant; and
    a first colorant;
    wherein the ink is a thermal inkjet ink, has a drying time of less than about 10 seconds, and has a decap time of at least about one minute, and the ink further comprises a second surfactant in addition to the first surfactant.

20. The ink of claim 19, wherein the second surfactant is a siloxane-based surfactant.

21. An inkjet ink, comprising:
    a first organic solvent, the first organic solvent being a fast organic solvent;
    a first resin;
    a first surfactant; and
    a first colorant;
    wherein the ink is a thermal inkjet ink, has a drying time of less than about 10 seconds, and has a decap time of at least about one minute, and the first surfactant is present in an amount of from about 1.1% to about 5% by weight of the ink.

22. The ink of claim 1, wherein the ink further comprises a second colorant in addition to the first colorant.

23. The ink of claim 19, wherein the ink has a decap time of at least about 5 minutes.

24. The ink of claim 19, wherein the ink has a decap time of at least about 15 minutes.

25. The ink of claim 19, wherein the ink has a decap time of at least about 30 minutes.

26. The ink of claim 19, wherein the ink has a drying time of less than about 8 seconds.

27. The ink of claim 19, wherein the ink has a drying time of less than about 6 seconds.

28. The ink of claim 19, wherein the ink has a drying time of less than about 2 seconds.

29. The ink of claim 19, wherein the fast organic solvent is selected from the group consisting of methanol, ethanol, propanol, iso-propanol, acetone, methyl ethyl ketone, methyl isobutyl ketone, pentane, hexane, heptane, methyl acetate, ethyl acetate, propyl acetate, and combinations thereof.

30. The ink of claim 19, wherein the fast organic solvent is ethanol.

31. The ink of claim 19, wherein the ink comprises greater than about 75% of the first organic solvent.

32. The ink of claim 19, wherein the ink comprises a second solvent in addition to the first organic solvent.

33. The ink of claim 32, wherein the second solvent is an intermediate solvent.

34. The ink of claim 19, wherein the first resin is selected from the group consisting of rosin modified phenolic resins, phenolic resins, styrene-acrylic resins, polyketone resins, polyvinyl butyral resins, acrylic resins, polyurethane resins, polyamide resins, polyvinylpyrrolidone resins, vinyl resins, and combinations thereof.

35. The ink of claim 19, wherein the ink further comprises a second resin in addition to the first resin.

36. The ink of claim 19, wherein the first surfactant is a fluorosurfactant, a siloxane-based surfactant, an acetylenic diol-based surfactant, a hydrocarbon-based surfactant, or a combination thereof.

37. The ink of claim 36, wherein the first surfactant is a fluorosurfactant.

38. The ink of claim 37, wherein the fluorosurfactant is selected from the group consisting of polyethylene oxide-b-poly(tetrafluoroethylene)polymers, 2-(perfluoroalkyl) ethyl stearate, anionic lithium carboxylate fluorosurfactant, anionic phosphate fluorosurfactant, amphoteric quaternary ammonium-acetate fluorosurfactant, and a combination thereof.

39. The ink of claim 37, wherein the fluorosurfactant is a polymeric fluorosurfactant.

40. The ink of claim 19, wherein the first surfactant is a siloxane-based surfactant.

41. The ink of claim 19, wherein the first surfactant is present in an amount of from about 1.1% to about 5% by weight of the ink.

42. The ink of claim 19, wherein the ink further comprises a second colorant in addition to the first colorant.

43. The ink of claim 20, wherein the ink has a decap time of at least about 5 minutes.

44. The ink of claim 20, wherein the ink has a decap time of at least about 15 minutes.

45. The ink of claim 20, wherein the ink has a decap time of at least about 30 minutes.

46. The ink of claim 20, wherein the ink has a drying time of less than about 8 seconds.

47. The ink of claim 20, wherein the ink has a drying time of less than about 6 seconds.

48. The ink of claim 20, wherein the ink has a drying time of less than about 2 seconds.

49. The ink of claim 20, wherein the fast organic solvent is selected from the group consisting of methanol, ethanol, propanol, iso-propanol, acetone, methyl ethyl ketone, methyl isobutyl ketone, pentane, hexane, heptane, methyl acetate, ethyl acetate, propyl acetate, and combinations thereof.

50. The ink of claim 20, wherein the fast organic solvent is ethanol.

51. The ink of claim 20, wherein the ink comprises greater than about 75% of the first organic solvent.

52. The ink of claim 20, wherein the ink comprises a second solvent in addition to the first organic solvent.

53. The ink of claim 52, wherein the second solvent is an intermediate solvent.

54. The ink of claim 20, wherein the first resin is selected from the group consisting of rosin modified phenolic resins, phenolic resins, styrene-acrylic resins, polyketone resins, polyvinyl butyral resins, acrylic resins, polyurethane resins, polyamide resins, polyvinylpyrrolidone resins, vinyl resins, and combinations thereof.

55. The ink of claim 20, wherein the ink further comprises a second resin in addition to the first resin.

56. The ink of claim 20, wherein the ink further comprises a second surfactant in addition to the first surfactant.

57. The ink of claim 20, wherein the first surfactant is present in an amount of from about 1.1% to about 5% by weight of the ink.

58. The ink of claim 20, wherein the ink further comprises a second colorant in addition to the first colorant.

59. The ink of claim 21, wherein the ink has a decap time of at least about 5 minutes.

60. The ink of claim 21, wherein the ink has a decap time of at least about 15 minutes.

61. The ink of claim 21, wherein the ink has a decap time of at least about 30 minutes.

62. The ink of claim 21, wherein the ink has a drying time of less than about 8 seconds.

63. The ink of claim 21, wherein the ink has a drying time of less than about 6 seconds.

64. The ink of claim 21, wherein the ink has a drying time of less than about 2 seconds.

65. The ink of claim 21, wherein the fast organic solvent is selected from the group consisting of methanol, ethanol, propanol, iso-propanol, acetone, methyl ethyl ketone, methyl isobutyl ketone, pentane, hexane, heptane, methyl acetate, ethyl acetate, propyl acetate, and combinations thereof.

66. The ink of claim 21, wherein the fast organic solvent is ethanol.

67. The ink of claim 21, wherein the ink comprises greater than about 75% of the first organic solvent.

68. The ink of claim 21, wherein the ink comprises a second solvent in addition to the first organic solvent.

69. The ink of claim 68, wherein the second solvent is an intermediate solvent.

70. The ink of claim 21, wherein the first resin is selected from the group consisting of rosin modified phenolic resins, phenolic resins, styrene-acrylic resins, polyketone resins, polyvinyl butyral resins, acrylic resins, polyurethane resins, polyamide resins, polyvinylpyrrolidone resins, vinyl resins, and combinations thereof.

71. The ink of claim 21, wherein the ink further comprises a second resin in addition to the first resin.

72. The ink of claim 21, wherein the first surfactant is a fluorosurfactant, a siloxane-based surfactant, an acetylenic diol-based surfactant, a hydrocarbon-based surfactant, or a combination thereof.

73. The ink of claim 72, wherein the first surfactant is a fluorosurfactant.

74. The ink of claim 73, wherein the fluorosurfactant is selected from the group consisting of polyethylene oxide-b-poly(tetrafluoroethylene)polymers, 2-(perfluoroalkyl) ethyl stearate, anionic lithium carboxylate fluorosurfactant, anionic phosphate fluorosurfactant, amphoteric quaternary ammonium-acetate fluorosurfactant, and a combination thereof.

75. The ink of claim 73, wherein the fluorosurfactant is a polymeric fluorosurfactant.

76. The ink of claim 21, wherein the ink further comprises a second surfactant in addition to the first surfactant.

77. The ink of claim 21, wherein the first surfactant is a siloxane-based surfactant.

78. The ink of claim 21, wherein the ink further comprises a second colorant in addition to the first colorant.

* * * * *

UNITED STATES PATENT AND TRADEMARK OFFICE
CERTIFICATE OF CORRECTION

PATENT NO. : 9,957,401 B2
APPLICATION NO. : 15/055152
DATED : May 1, 2018
INVENTOR(S) : Benjamin J. Brown et al.

It is certified that error appears in the above-identified patent and that said Letters Patent is hereby corrected as shown below:

On the Title Page

Column 1, under Notice, Line 3: after "0 days.", delete "days."

Signed and Sealed this
Third Day of July, 2018

Andrei Iancu
*Director of the United States Patent and Trademark Office*